July 3, 1956  S. PRUSINSKI  2,752,964
FLEXIBLE HAND SAW
Filed April 15, 1953

INVENTOR.
STANLEY PRUSINSKI
BY Bates, Teare, & M<sup>c</sup>Bean
ATTORNEYS

United States Patent Office 2,752,964
Patented July 3, 1956

2,752,964

FLEXIBLE HAND SAW

Stanley Prusinski, Newburgh Heights, Ohio

Application April 15, 1953, Serial No. 348,871

2 Claims. (Cl. 145—31)

This invention relates to a flexible saw and particularly to a flexible saw which will enable the trimming and cutting of trees and the like with a minimum amount of effort. These, therefore, are the general objects of the present invention.

Another object of this invention is to provide an improved flexible saw which may be readily coiled for transporting it from place to place, or looped about a work piece and drawn back and forth by one person. Further the invention contemplates the provision of an improved flexible saw which will readily discharge the dust and chips and facilitate the starting of the cut.

According to the present invention the improved flexible saw includes an elongated flexible core such as a wire, a wire rope or the like having a handle at each of its ends and a series of hollow cylindrical members strung thereon and extending end to end from one handle to the other, certain of the members having an annular peripheral cutting edge arranged to produce a cutting action when the saw is drawn across the work piece in one direction only, the other members being non-cutting members of which there are a plurality strung end to end at the mid-portion of the core, the end portions of the core being strung with alternately disposed cutting and non-cutting members, the cutting members at one end being arranged to cut as the core is drawn in one direction and those on the other end being arranged to cut as the saw is drawn in the opposite direction.

Other objects and advantages of the invention together with the manner in which they are accomplished will become more apparent from the following description relating to an embodiment of the invention illustrated in the accompanying drawings, in which.

Figure 1:
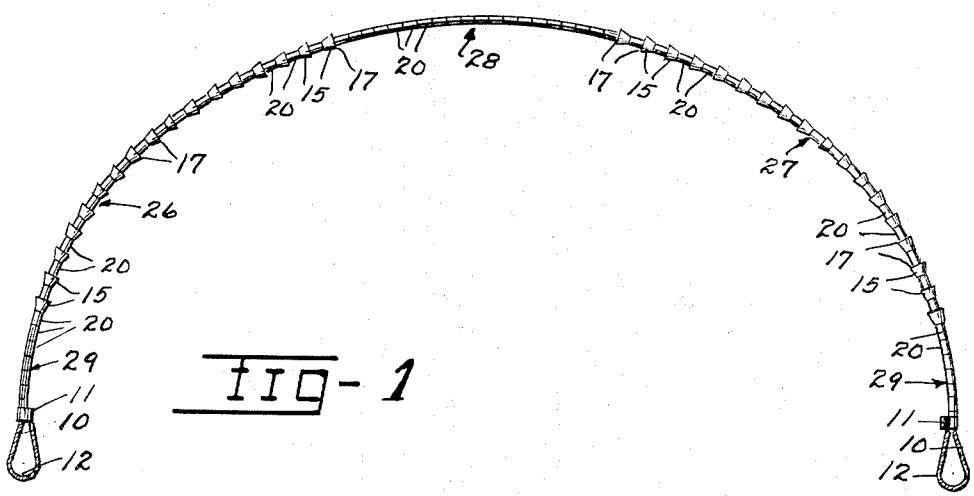
Fig. 1 is an elevation of the improved flexible saw, various dimensions thereof being exaggerated to more clearly illustrate the structure.
Figure 2:
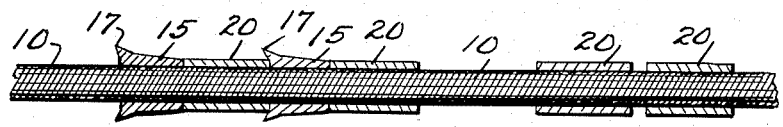
Fig. 2 is an enlarged fragmentary view of a portion of the saw, certain of the elements thereof illustrated in axial section.
Figure 3:
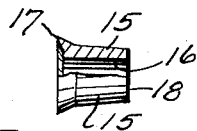
Fig. 3 is a view, partially in section, of one of the cutting elements of the saw removed from the supporting core.

The improved saw as illustrated in Fig. 1 comprises an elongated flexible core 10, such as a wire or more preferably a wire rope. Suitable handles 62 are formed on or secured to the ends of the core 10. As illustrated the ends of the core 10 are turned back and are secured to the core by suitable clamps 11 thereby forming loops or handles 12. The specific form of these clamps may vary, however, I have found that they may comprise metal straps which are swedged in place.

Figure 5:
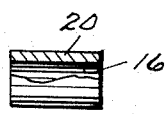
Fig. 5 is a view, partially in section, of one of the non-cutting elements removed from the core.
Figure 4:
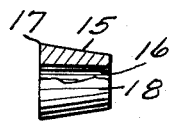
Fig. 4 is a view similar to Fig. 3, but illustrating a modified form of cutting element.

A plurality of cutting members 15 are strung on the core 10. These cutters are cylindrical and each cutter is provided with an axial opening 16 to receive the core. The diameter of the opening 16 is such that it permits its cutting member to move freely into position on the core and rotate about the axis thereof when so strung. At one end each cutting member 15 is provided with an annular peripheral cutting edge 17. This cutting edge is such that it is effective to cut only when the core 10 is drawn in one direction. Two forms of cutting members as shown, one in Fig. 4 and the other in Fig. 5.

The cutting members 15 are spaced by non-cutting members 20. These members are in the form of cylindrical sleeves and have the same internal diameter as that of the cutting members 15. The external diameter of the non-cutting members preferably is the same as that of the end 18 of the cutters remote from the cutting edges 17.

The cutting members 15 and the non-cutting members 20 are strung on the core 10 substantially as shown in Fig. 1. It will be noted that the cutters 15 are alternated with the non-cutters or spacers 20 on the end portions 26 and 27 of the core, while the mid-portion 28 of the core is provided with non-cutters or spacers 20 only. The mid portion 28 of the saw is preferably from one-half to three-quarters as long as the end portions and comprises a sufficient number of non-cutting elements to permit movement of the saw across the maximum size work piece with which the saw is intended to be used without contact between the work piece and the cutters. Accordingly, when it is desired to start a cut, the mid-portion 28 of the saw may be placed in contact with the work, the saw moved a short distance before contact is made between the work piece and the cutters. This greatly facilitates the starting of the cut.

The non-cutting mid-portion 28 provides an additional advantage. It eliminates choking of the saw by chips in the kerf. This results in the fact that all of the cutters pass out of the kerf during each passage of the saw thus assuring discharge of the chips while the cutters are free from the work piece.

The cutters 15 of the portion 25 face in the opposite direction from those on the portion 26. As illustrated all of the cutters face the mid-portion 28 of the saw. This is a decided advantage as it permits considerable movement to be imparted to the saw on each cutting stroke before the cutting action is started, thereby facilitating cutting with a minimum amount of effort. Likewise as alternate cuts are made by cutters facing in opposite directions the cutting action is more uniform and chattering of the saw is eliminated.

In Fig. 1 the extreme end portions 29 adjacent the handles 12 are illustrated as having no cutters. These portions 29 space the cutters from the handles 12 and provide an improved safety factor.

As heretofore mentioned, the relative proportions and dimensions of the various parts have been exaggerated in Fig. 1 to facilitate illustration of the saw. However, it has been found that where a saw of an overall length of approximately five feet is desired, it is preferable to allow about a half of foot in length for each handle including the portion 29, about a foot-and-a-half for each cutting portion 25 and 26, and about ten to twelve inches for the mid-portion 28. Similarly in such a saw the core would comprise a steel wire rope about an eighth of an inch in diameter having hardened steel spacers or non-cutting members of about a thirty-second of an inch wall thickness and cutters having cutting edges which protrude about a fiftieth of an inch beyond the periphery of the adjacent spacer. A saw so constructed permits the cutting and trimming of trees and the like by one person with a minimum amount of effort.

The looped handles at the ends of the saw have a particular advantage in that a rope may be attached to each handle loop to facilitate cutting branches located at heights which otherwise would require the use of a ladder or the like. One rope may be thrown across the branch to be cut and used to draw the saw into starting position, and the two ropes then used to draw the saw back and forth to sever the branch.

I claim:

1. A flexible saw comprising an elongated flexible core, a handle secured to each end of the core, a plurality of cylindrical members strung on said core and extending from one handle to the other, certain of said members comprising cutting members, each cutting member having an annular peripheral cutting edge arranged to produce a cutting action as the member is moved axially in one direction the other of said members being non-cutting members, there being a plurality of non-cutting members strung end to end on the mid-portion of the core, the end portions of the core being strung with alternately disposed cutting and non-cutting members, the cutting members of one end portion being arranged to cut as the core is pulled in one direction and those of the other portion being arranged to cut as the core is pulled in the opposite direction, said end portions being of substantially the same length and said mid-portion being of from one-half to three-fourths the length of said end portions whereby a non-cutting starting section is provided intermediate the cutting sections.

2. A flexible saw for trimming trees and the like and comprising an elongated flexible wire rope core having a diameter of substantially one-eighth inch, a handle secured to each end of said core, a plurality of individual cylindrical sleeve-like hardened steel members strung end to end on said core and extending from one handle to the other each having a wall thickness of substantially one thirty-second of an inch, a certain of said members comprising cutting members and having a peripheral cutting edge at one end which protrudes about one-fiftieth of an inch beyond the outer wall of such member, there being a plurality of non-cutting members strung end to end on the mid-portion of said core, the end portions of the core being strung with alternately disposed cutting and non-cutting members, the cutitng members on each end portion being arranged to cut only as the core is pulled toward the opposite end portion, and wherein said end portions are of substantially equal length and the non-cutting mid-portion is from one-half to three-fourths as long as the end portions to thereby provide a non-cutting portion to facilitate starting of the cut.

References Cited in the file of this patent

UNITED STATES PATENTS

| 318,367   | Liepe   | Jan. 24, 1920 |
| 1,967,116 | Gerdetz | July 17, 1934 |

FOREIGN PATENTS

| 1,703 | Great Britain | Jan. 25, 1893 |